United States Patent Office 2,760,869
Patented Aug. 28, 1956

2,760,869

METHOD OF PRODUCING CONDIMENTS

Nicholas S. Yanick, Chicago, Ill., assignor to Kraft Foods Company, Chicago, Ill., a corporation of Delaware No Drawing. Application September 24, 1952,
Serial No. 311,320

15 Claims. (Cl. 99—140)

The present invention relates generally to condiments, and more particularly, it relates to the provision and preservation of fresh flavors which result from plants through enzymatic action.

Various fruits derive their flavor from chemicals which are naturally present in the fruit. (The term fruit, as used herein, includes any product of plants which is useable as food.) For example, pepper obtains its flavor from the presence of alkaloids, such as piperine, and oranges, lemons, and grapefruit obtain part of their flavor from the presence of oils of the terpene family, while strawberries are flavored as a result of the presence of organic esters and alcohols.

However, another class of fruits, which are generally used as condiments, do not acquire their characteristic flavor from naturally formed flavor compounds but the characteristic flavor results from the formation of compounds through enzymatic action when the fruit is crushed or cut in the presence of water, either mechanically or in the mouth through mastication. By way of example, such fruits include mustard seed, garlic, onion, radishes, horseradish, and chives. In these fruits, the characteristic flavor is produced through action of a contained enzyme upon a substrate in the presence of water. In general, however, the reaction is a continuing and eventually deteriorating reaction which, in the course of time, results in the production of undesired flavors and loss of the characteristic flavor.

These fruits, whose flavor is not naturally occurring but is produced through enzymatic action, contain the flavor producing materials within separate sections of the fruit, the substrate being lodged in a certain section of the fruit and the enzyme being in another section of the fruit so that the enzyme is not able to react with the substrate. Upon crushing, the natural fruit structure is broken down and the enzyme is able to act on the substrate resulting in the production of the characteristic flavor. However, the flavor producing compound is usually very unstable and may react with water or other materials to produce undesired compounds which impair the characteristic flavor.

The flavor producing compounds may deteriorate through oxidation, hydrolysis, decomposition, or reaction, and may become lost through volatilization, or precipitation, or the formation of flavorless or undesirous flavored compounds. The quality of food product containing flavor producting compounds is, of course, directly related to the stability of the compounds which produce the characteristic flavor. Prior to my invention, there has not been any highly satisfactory means for substantially inhibiting deterioration of such compounds when they result from the action of enzymes upon substrates in fruits.

Of course, when a fruit whose flavor results from the action of an enzyme upon a substrate is to be consumed immediately after it is crushed or cut there is little concern with respect to flavor deterioration. However, when such a fruit is to be used in the preparation of flavored food products such as dressings, relishes, and sauces, or the fruit is crushed or cut and packaged, it is quite important that the flavor not deteriorate rapidly or even after relatively long periods of time.

The main object of my invention is, therefore, the provision of and/or preservation of the characteristic flavor of fruits, the flavor of which results from the action of an enzyme with a substrate, and another object of the invention is the provision of intermediate products from such fruits, which products may be used in the preparation of food products such as dressings, relishes and sauces, and provide the food product with the characteristic flavor when it is consumed. These and other objects of the invention are accomplished through inhibiting or preventing the enzymatic reaction, as by eliminating or minimizing contact of the enzyme with the substrate or through elimination of water or moisture in the fruit in such a manner that enzymatic action is inhibited or prevented prior to consumption of the fruit.

In the practice of my invention, a fruit, which acquires its characteristic flavor through the action of an enzyme upon a contained substrate, is crushed or cut under such conditions that the action of the enzyme with the substrate is controlled or prevented. This may be done by crushing or cutting the fruit in such manner that the substrate and/or enzyme is coated with a material which provides a partial or complete barrier between the enzyme and substrate, thereby controlling or preventing enzymatic action.

As an alternative, the moisture in the plant may be substantially or completely removed as a liquid under conditions such that neither the substrate nor the enzyme is damaged, whereupon the plant may be cut or crushed without the enzyme reacting with the substrate. When the plant is treated in this manner, the particles may be coated so that they may be placed in a liquid carrier without the substrate substantially reacting with the enzyme.

As a second alternative, the enzyme may be either partially or completely deactivated, whereupon the substrate may be coated or protected and later the enzyme reactivated or the protected substrate mixed with the enzyme in a liquid carrier. If the enzyme is partially deactivated, the fruit may be cut or crushed and the lack of available active enzyme retards the reaction of enzyme with substrate.

In many cases, the substrate comprises an oil and the enzymatic material is water soluble, and accordingly, the substrate and enzymatic material may be emulsified thereby controlling or preventing the action between the enzymatic material and the substrate.

For purposes of more completely describing my invention, I will describe it particularly in connection with garlic, though it will be understood that the principles are equally applicable to other fruits which derive their characteristic flavor through enzymatic action, such as onions, radishes, mustard seed, and horseradish. In the practice of my invention, garlic bulbs are taken and broken up into their individual cloves, after the roots, tops and outer skins have been removed by suitable means such as a blower. Care should be taken so that the bulbs are not crushed when cleaned and divided into cloves. The garlic cloves contain a complex, sulfur bearing compound, alliin, which is in the parenchyma portion of the bulb, and also contains the enzyme alliinase which is disposed in the protein cells of the phloem and the bundle sheath of the cloves. In addition, the bulb has a moisture content of from about 65 to 70 percent and contains small amounts of other ingredients, such as minerals, cellulose and oils.

So long as the alliin does not come into contact with the alliinase in the presence of water or moisture, the characteristic flavor of garlic is not provided. However, when the garlic clove is crushed or cut, the cells containing the alliinase are ruptured in the presence of moisture thereby causing the alliin to decompose and form a series of compounds at least one of which provides the characteristic flavor of garlic. The reaction between the alliin and alliinase is very rapid and consequently the compounds providing the characteristic flavor are formed very rapidly. It is believed that the characteristic garlic flavor which is desired does not result from any one individual reaction product but comprises a blend of the reaction products.

The breakdown of the alliin when reacted with the alliinase is believed to proceed as follows:

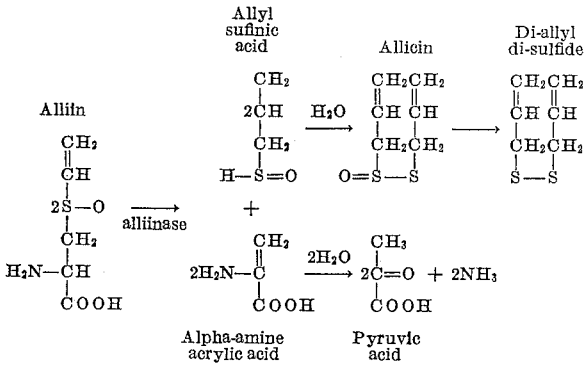

It will be seen from the foregoing formulas that when the alliin is acted upon by the alliinase two intermediate products are formed, viz. allyl sulfinic acid and alpha-amino acrylic acid. The allyl sulfinic acid, in the presence of water, decomposes into allicin, which, in turn, decomposes to di-allyl di-sulfide and other sulfides. The alpha-amino acrylic acid, upon reaction with water goes to pyruvic acid and ammonia.

The presence of the di-allyl di-sulfide and other sulfides is believed largely responsible for the harsh garlic flavor which normally develops after garlic is cut or crushed. Of course, the breakdown of the acrylic acid and the formation of ammonia is also not desirable. On the other hand, the allicin is believed to provide, in large part, the clean, wholesome, and mellow garlic flavor which is highly desirable and has not been maintainable heretofore. In the practice of my invention, I inhibit or prevent the formation of substantial amounts of di-allyl di-sulfide and ammonia.

This may be accomplished by taking the cleaned cloves of garlic and mixing them with an edible oil, such as cotton oil or soya oil, or other liquid having hydrophobic properties. The liquid and garlic clove mixture is then run through a grinder so that the cloves are crushed or ground in the presence of an excess of the liquid to form a mash. Through grinding in this manner, the substrate, alliin, is dissolved in the oil or hydrophobic liquid and is thereby substantially prevented from reacting with the enzyme alliinase which is coated with the liquid. The resulting mash may be immediately incorporated into a food product such as mayonnaise, salad dressing or sauce, or may be stored, preferably at temperatures below about 20° F. The mash may be quick frozen and stored for even longer periods of time.

I have found that when the mash prepared in the manner described is incorporated into a dressing, it will retain a clean garlic flavor for over three months and, in this connection, such a flavor stabilized dressing has not been previously available upon the market. The previous dressings of this type did not keep longer than two or three weeks under like conditions.

As a specific example, garlic bulbs were broken up into cloves and the roots, tops and other skins removed by means of a blower. The cleaned cloves were then further peeled in order to remove the adhering cellulosic tissue, whereupon the cloves were mixed with an equal weight of cotton seed oil, and the mixture was then poured into a fine grinder and a garlic oil mash was recovered. The mash was mixed into a dressing, and it was found that after three months the dressing still had a clean garlic flavor.

The garlic cloves may also be dried in such a manner that the alliin is not damaged and the alliinase is not harmed. This may be done in a desiccator over a substantial period of time of about 5 days. After the garlic clove is dried, it may be ground and then mixed with an edible oil. The resulting mixture may be kept for substantial periods of time while retaining a clean garlic flavor. The mixture may be incorporated into mayonnaise, dressings, or sauces for immediate use or, as in the previously described case may be stored at low temperatures.

As above pointed out, the reaction between the alliin and alliinase, which results in the production of allicin, the desired flavoring compound, requires the presence of moisture or water. Therefore, by effectively removing the water or moisture before crushing or cutting of the garlic cloves, the alliinase will not substantially react with the alliin during crushing or cutting. As pointed out, this may be done by removing the water or moisture but effective removal may also be accomplished by freezing the garlic cloves to the point where any moisture has been completely solidified, whereupon the cloves may be crushed or cut at low temperatures and kept until used. The solidified moisture may also be removed through sublimation after crushing or cutting.

In addition to the foregoing ways of preparing garlic, the cloves may be treated in such a way that the alliinase is made ineffective, and consequently, it does not have any effect upon the alliin when the cloves are cut or crushed. After the allinase has been made ineffective, the cloves may be ground and combined with edible oil and stored. When the ground mixture is prepared in this way, it must be combined with some alliinase if the desirable garlic flavor is to be obtained. In the latter connection, the mixture may be combined with mash prepared by grinding cloves, or with the oil and garlic mixture prepared in the manner described above, so that there is present in the combined mixture a substantial excess of alliin as compared to the alliinase. As a result of such combination, the rate of reaction of the alliinase with the alliin is substantially decreased and when the overall mixture is incorporated into a dressing or other food product, the alliin is acted upon relatively slowly and the clean garlic flavor will prevail for extended periods.

The alliinase may be made ineffective by destruction or by deactivation. In the former connection, alliinase is destroyed by alcohol vapors and, when destroyed, new enzyme must be provided to react with the substrate, alliin, to provide the desired flavor. On the other hand, the allinase may be deactivated by adjustment of pH, which may be readjusted to reactivate the enzyme when desired.

In the foregoing, I have described my invention in connection with garlic, but, as pointed out, the principles of my invention are equally applicable to other fruits which derive their characteristic flavor through the reaction of an enzyme with a substrate which naturally occurs in the fruit, such as onions, horseradish, mustard seed, etc.

When the principles of my invention are practiced, a product is provided which, when eaten, has a clean, wholesome flavor. This results from retarding or preventing enzymatic action, which action is stimulated through combining of the enzyme and substrate in the mouth so that the characteristic flavor is immediately produced or accentuated and off or undesirable flavors are not produced. This clean flavor is readily distinguishable from that provided by the compounds now generally on the market in the form of oils, juices, and powders. More particularly, garlic oil which is prepared by extraction and distillation procedures have a strong, harsh, mercaptanlike odor and does not have the clean garlic flavor resulting from the practice of my invention.

The juices are prepared by pressing the fruits but when this is done the characteristic flavor tends to rapidly deteriorate and form undesired flavors.

In addition to the oil and juice products, the fruits, which acquire their characteristic flavor through enzymatic action, are often ground and the moisture removed at low temperatures and under vacuum conditions. However, due to the fact that the fruit is cut or ground while some moisture is present, a reaction is initiated between the enzyme and substrate causing the eventual production of undesired flavor producing compounds. This prevents the establishment of a characteristic flavor free of overriding and unsatisfactory flavor effects.

It will be seen from the foregoing that as a result of the practice of my invention, the characteristic flavor of fruits whose flavor results from enzymatic action is preserved for extended periods which are substantially longer than has heretofore been possible. This provides extensive advantages in the food field and makes possible substantially improved food products.

The features of my invention which are believed to be new are set forth in the following claims.

I claim:

1. The method of preserving the characteristic flavor of fruits after breaking down the physical structure of the fruit, the fruit being of the type which derives its characteristic flavor through enzymatic action between an enzyme and a substrate naturally occurring in the fruit, said method comprising the steps of non-destructively inhibiting the reaction of the enzyme with the substrate by minimizing the contact between the enzyme and the substrate during the breakdown of the physical structure, and maintaining the enzyme with said substrate in a viable form.

2. The method of preserving the characteristic flavor of fruits after breaking down the physical structure of the fruit, the fruit being of the type which derives its characteristic flavor through enzymatic action between an enzyme and a substrate naturally occurring in the fruit, said method comprising the steps of non-destructively inhibiting the reaction of the enzyme with the substrate by breaking down the physical structure of the fruit in the presence of an excessive hydrophobic liquid, and maintaining the enzyme with said substrate in viable form.

3. The method of preserving the characteristic flavor of fruits after breaking down the physical structure of the fruit, the fruit being of the type which derives its characteristic flavor through enzymatic action between an enzyme and a substrate naturally occurring in the fruit, said method comprising the steps of non-destructively inhibiting the reaction of the enzyme with the substrate by grinding the fruit in the presence of an excess of edible oil, and maintaining the enzyme with said substrate in viable form.

4. The method of inhibiting the production of the characteristic flavor of garlic upon grinding which comprises grinding garlic in the presence of an excess of an edible oil, storing the resulting product at a temperature below 20° F., and maintaining the viability of the enzyme.

5. The method of preserving the characteristic flavor of fruits, which derive such flavor through enzymatic action, after breaking down the physical structure of the fruit, which comprises effectively removing any moisture without damage to the enzyme and substrate.

6. The method of preserving the characteristic flavor of fruits, which derive such flavor through enzymatic action, after breaking down the physical structure of the fruit, which comprises effectively removing any moisture by drying the fruit at a temperature below that which would cause damage to the enzyme and substrate.

7. The method of preserving the characteristic flavor of fruits, which derive such flavor through enxymatic action, after breaking down the physical structure of the fruit, which comprises effectively removing any moisture by freezing any moisture present and then breaking down the physical structure of the fruit.

8. The method according to claim 6 where the fruit is garlic.

9. The method according to claim 7 where the fruit is garlic.

10. The method of preserving the characteristic flavor of fruits, which derive such flavor through enzymatic action, after breaking down the physical structure of the fruit, which comprises deactivating the enzyme in the fruit, and grinding the mixed fruit.

11. The method of preserving the characteristic flavor of fruits, which derive such flavor through enzymatic action, after breaking down the physical structure of the fruit, which comprises destroying the enzyme in the fruit, then mixing the fruit with like fruit containing active enzyme, and grinding the mixed fruit in the presence of an excess of oil.

12. The method according to claim 10 wherein the fruit is garlic.

13. The method according to claim 11 wherein the fruit is garlic.

14. The method of preserving the characteristic flavor of fruits, which derive such flavor through enzymatic action, in dressing, the method comprising grinding the fruit in an excess of oil, preparing an emulsion from the ground fruit, combining the emulsion in a dressing, and maintaining the enzyme in viable form in the emulsion.

15. The method set forth in claim 14 wherein the fruit is garlic.

References Cited in the file of this patent

UNITED STATES PATENTS

| | | |
|---|---|---|
| 1,716,323 | Rector | June 4, 1929 |
| 1,956,362 | Rolle | Apr. 24, 1934 |
| 2,088,622 | Stokes et al. | Aug. 3, 1937 |
| 2,561,797 | Huntsinger | July 24, 1951 |